United States Patent [19]

Suzuki

[11] Patent Number: 5,077,727
[45] Date of Patent: Dec. 31, 1991

[54] BROADBAND INFORMATION COMMUNICATIONS NETWORK SYSTEM WITH COHERENT OPTICAL DATA TRANSMISSION LINES

[75] Inventor: Nobuo Suzuki, Tokyo, Japan

[73] Assignee: Kabushiki Kaisha Toshiba, Kawasaki, Japan

[21] Appl. No.: 530,156

[22] Filed: May 29, 1990

[30] Foreign Application Priority Data

May 29, 1989 [JP] Japan .................................. 1-135507

[51] Int. Cl.⁵ ................................................ H04J 4/00
[52] U.S. Cl. ........................................ 359/123; 370/50
[58] Field of Search ............................... 370/1, 3, 4, 50

[56] References Cited

U.S. PATENT DOCUMENTS

| 4,386,424 | 5/1983 | Christensen | 370/4 |
| 4,704,715 | 11/1987 | Shibazaki et al. | 370/50 |
| 4,821,255 | 4/1989 | Kobrinski | 370/3 |
| 4,928,272 | 5/1990 | Olive | 370/50 |

FOREIGN PATENT DOCUMENTS

| 0164340 | 9/1983 | Japan | 370/1 |
| 0158661 | 9/1984 | Japan | 370/50 |
| 0294144 | 11/1988 | Japan | 370/50 |

OTHER PUBLICATIONS

IEEE Int. Conf. on Communications '87, Proceedings, vol. 3 (Cat. No. 87CH2424-0), pp. 1593-1600, I. M. I. Habbab et al., 7-10, Jun. 1987.

IEEE Journal on Selected Areas in Communications, vol. 6, pp. 1500-1510, E. Arthurs et al., Dec. 1988.
The Transactions on the IEICE, vol. E72, pp. 55-62, M. Fujiwara et al., Jan. 1989.

Primary Examiner—Reinhard J. Eisenzopf
Assistant Examiner—Kinfe-Michael Negash
Attorney, Agent, or Firm—Oblon, Spivak, McClelland, Maier & Neustadt

[57] ABSTRACT

A terminal-inside signal handing architecture is disclosed which is preferably applied to an extra-large capacity digital integrated network for optical broadband information communications among terminal stations via optical fiber link cables. A terminal station has a signal input section including optical demultiplexers and optoelectric converters, a signal output section connected with optical fiber cables and including electrooptical converters, and a data switching section provided between the signal input and output sections. The switching section has a main section connected to a sub-network system, demultiplexers provided at prestage of the main section, and multiplexers provided at the post-stage of the main section. The switching section disassembles and exchange only selected ones of the input information supplied to this station, the remaining ones of the input signals are directly transferred by direct connection lines between the input section and the output section at higher transmission rate without through the switching section in such a form as they are output by the signal input section.

12 Claims, 6 Drawing Sheets

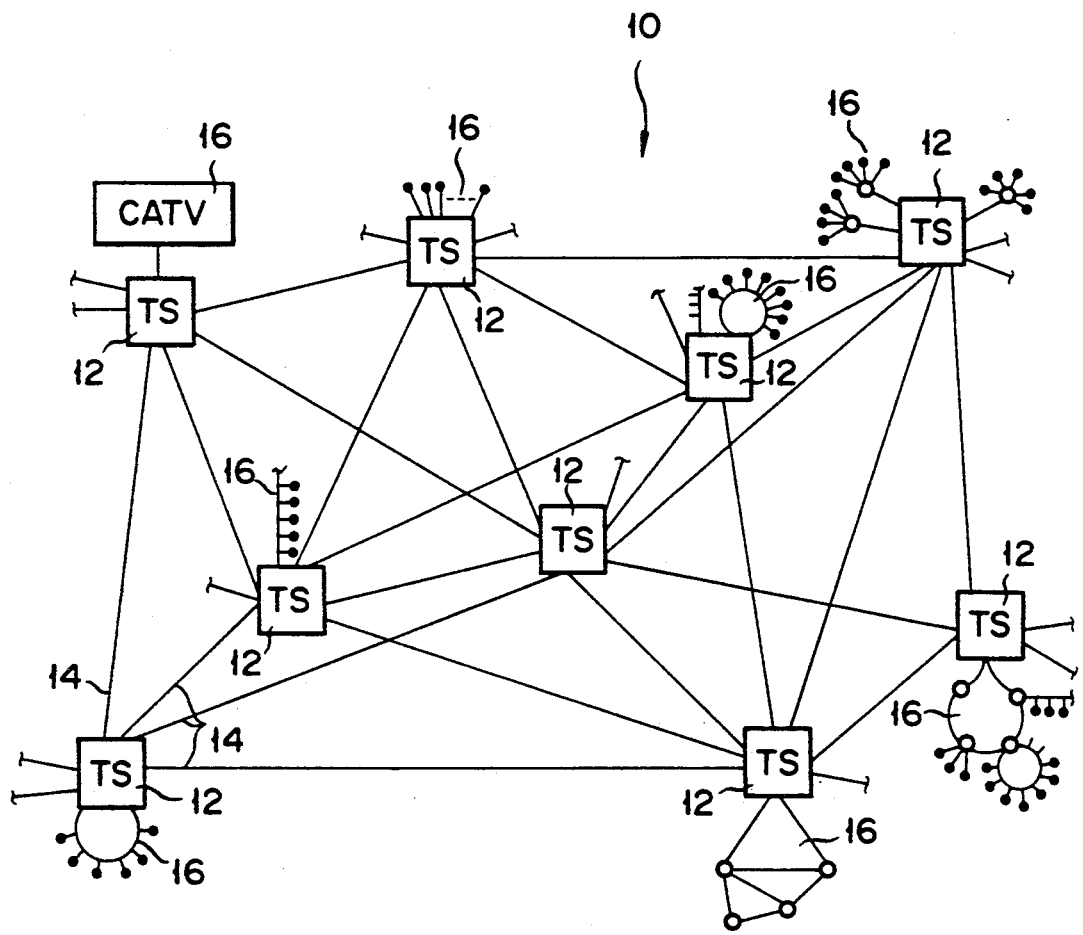
F I G. 1

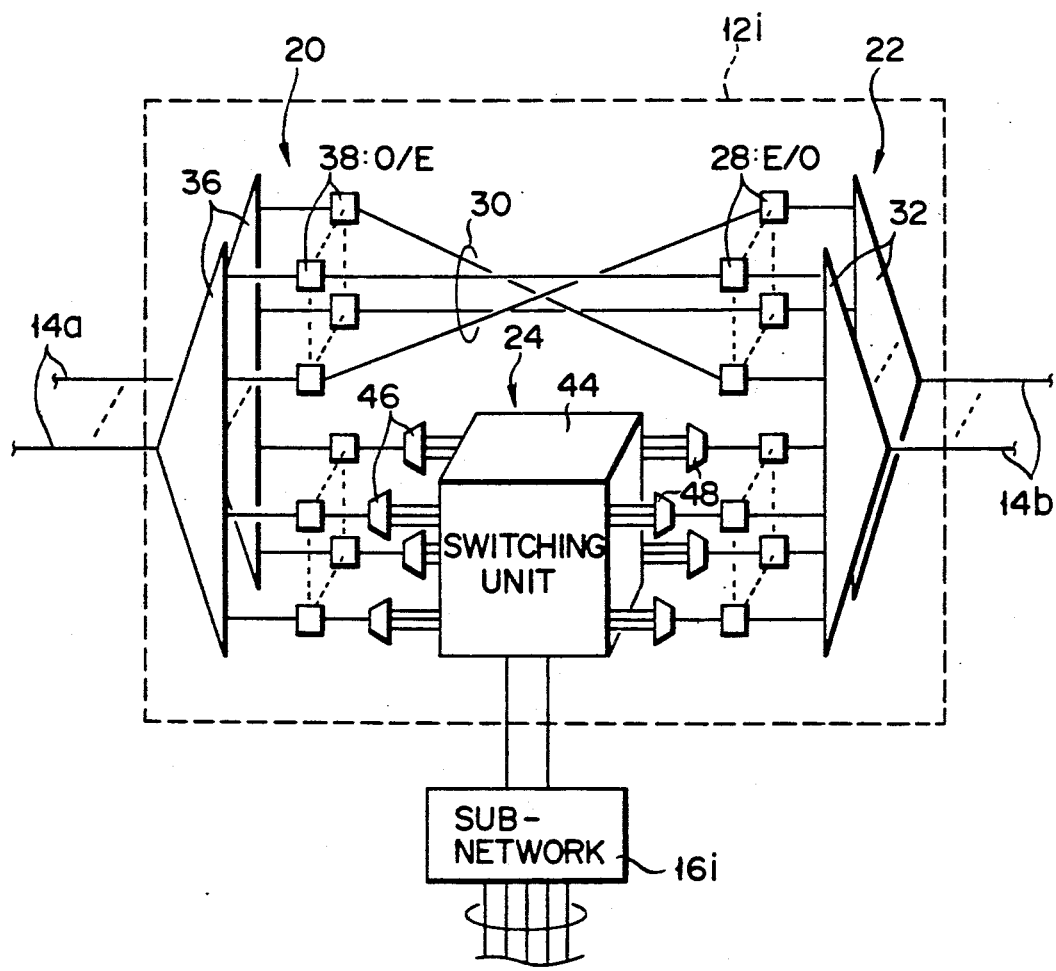
F I G. 3

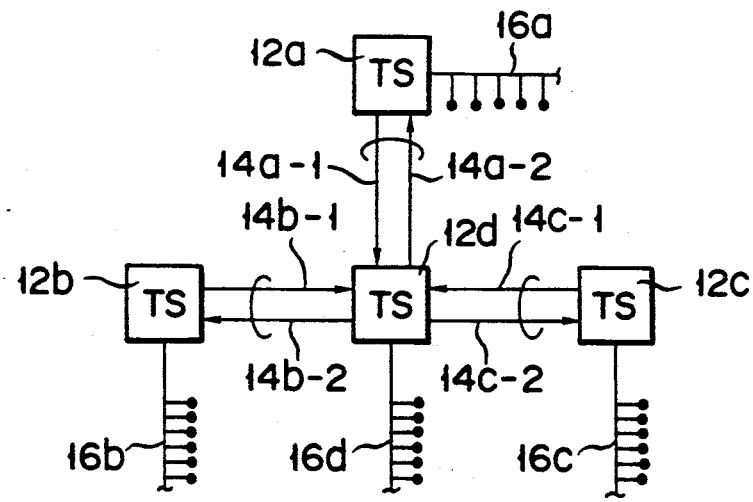
F I G. 4
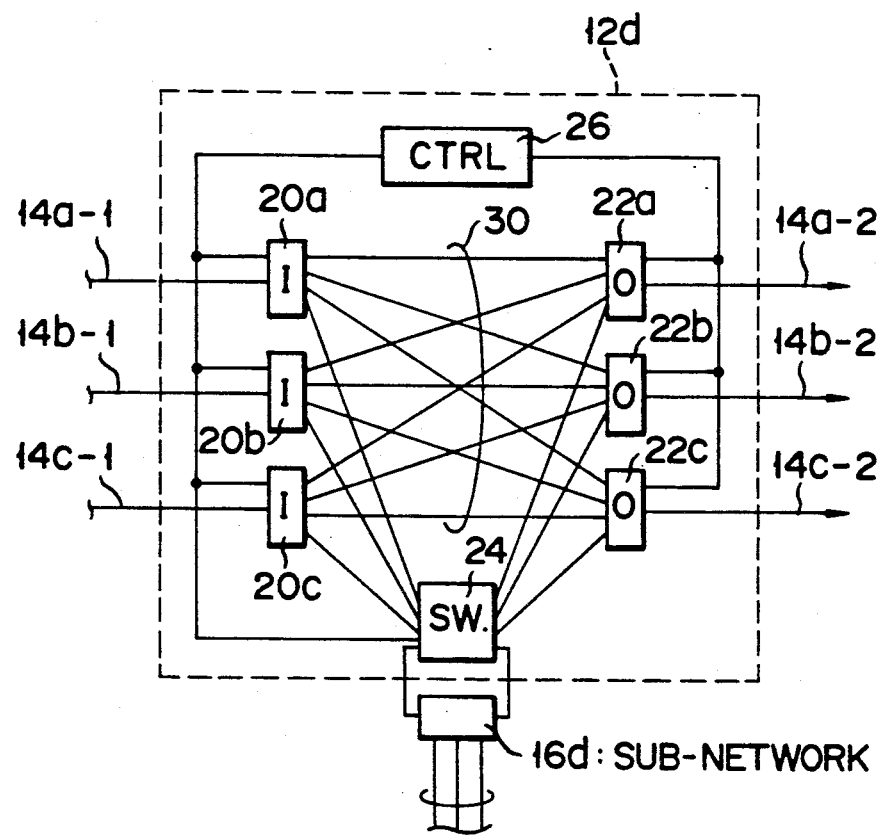
F I G. 5

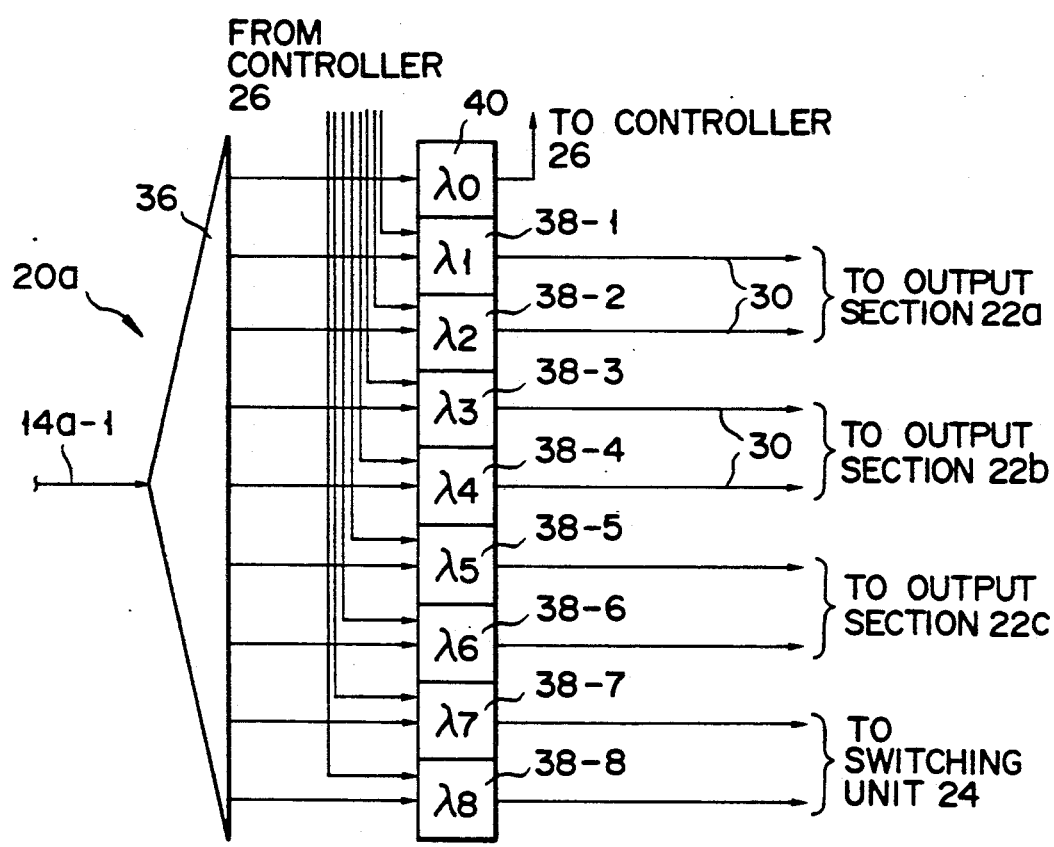
F I G. 6

BROADBAND INFORMATION COMMUNICATIONS NETWORK SYSTEM WITH COHERENT OPTICAL DATA TRANSMISSION LINES

BACKGROUND OF THE INVENTION

1. Field of the Invention

The present invention relates to data transmission systems for communications and, in more particular, to a large-capacity data transmission architecture for time-division/optical frequency-division multiplexed information signals using coherent optical data transmission lines.

2. Description

With the increasing needs for high performance and reliability of data communications systems, development of optical high-density data transmission technology with a large capacity becomes indispensable which can send out and take in highly multiplexed opto-electrical information signals. Attention should be paid to the fact that in recent years an advanced broadband digital information communications network system has been developed which can provide, in addition to voice service, several kinds of services handling high-speed data and video image data that are transmitted simultaneously among terminal stations or local stations. Such type of network system has been known as the "broadband integrated service of digital network," or for short, the "B-ISDN."

In the "B-ISDN" system, information signals will be typically time-division multiplexed with signal transmission rate ranging 150 and 160 mega-bit per second (Mbps) 155.52 Mbps, for example as a unit. It will not be expected that such high-density signals are processed by using the conventional large-capacity data transmission technology using the old combination of semiconductor laser modulation scheme and direct demodulation. The reason of for this is as follows: even if the presently available "large-capacity" data transmission technology offering the maximum rate of 10 giga-bit per second (Gbps), data communication lines among terminal stations cannot provides more than 64 line-channels. Accordingly, it has been strongly demanded in the art to develop a powerful data transmission technique that can break the "64 lines" limitation, and can offer an extra large capacity of data transmission, which will be at least several tens times as great as that of the currently available technology, or preferably, much greater than that.

With the highly advanced extra large-capacity data transmission system, a digital data exchange unit, known as the "digital switching unit," which is provided within each of the terminal stations for data exchange among other terminal stations associated therewith, will naturally be complicated in its internal arrangement. In order to internally exchange all of the high-speed and high-density data signals being supplied from the increased number of terminal stations, the digital switching unit should be required to "decode" the individual signal of multiplexed input data signals externally supplied thereto, branch-exchange the decoded signals, and "encode" again for the purpose of external transmission. Accordingly, if the conventional digital switching technology is simply applied to such extra large capacity data transmission system as it is, the data processing load of every internal switching unit will become heavier incredibly. This makes it impossible to exhibit the full advantage of extra large capacity, high speed, and high quality data transmission that is inherently executable in the highly advanced data transmission system.

Some of the serious problems in internal switching exchange units of the aforementioned data transmission system of "extra-large" capacity will be explained hereinafter in more practical manner. It is to be assumed in a B-ISDN system that a signal transmission unit is set to 600 Mbps for the aim of simplicity of explanation. A high-definition TV image signal may be compressed by using a conventional band compression technology to a signal level of 150 Mbps, so that 600 Mbps corresponds to the amount of four channels of normal high-definition TV image signals. It should be noted that the discussion presented below will also be true even if the signal unit is changed to a different value, such as about 50 Mbps, or 150 Mbps; it will be true even when it is applied to a different type of extra-large capacity data transmission system other than the B-ISDN type system.

In the B-ISDN type system, data transmission in an a synchronous transfer mode, known as "ATM," will be utilized with higher possibility for at least base communication lines of the system in order to maximize the flexibility of signals to be processed and at the same time the efficiency in use of data transmission band path. With such ATM transmission scheme, each of data signals to be transmitted is time-division multiplexed with a "cell" which consists of a header section and a data section being as a unit. In this case, a coherent optical frequency-division multiplexing (FDM) transmission system will be preferably used, wherein a hundred of signal channels can be processed at a time and each of the channels may be time-division multiplexed at a level of 2.5 Gbps, which is about sixteen times that of the four channel-compressed high-definition TV image signal.

Optical fiber transmission paths, or optical links, briefly, are provided among terminal stations in such a manner that each of these terminal stations is connected with a plurality of optical links to enable it to communicate with some of these terminals simultaneously. Typically, each terminal station may be supplied with input signals of several thousands of channels, or more, each of which provides unit signals of 600 Mbps. In that case, an internal data switching unit provided inside each of the terminal stations may be a 800×800 ATM switching network which has four stages of 256 module arrays: each module includes large-scale integrated (LSI) ATM switches of 32 rows and 32 columns. These self-routing switches are such switches the outputs of which may be automatically determined depending upon the contents of the header section of the signal. The fact that the transmission rate of the input signals is as high as 600 Mbps should require the self-routing switches to operate at enhanced switching rate enabling to deal with such high-speed input signals. It should also be required that internal electrical signal lines provided inside the data switching unit for transmitting the high-speed data signals at 600 Mbps are short in length as much as possible and adjusted to exhibit the same transmission delay thereamong.

Taking the above conditions into consideration, it is highly required for the individual internal digital switching unit, which is provided in each terminal station under the B-ISDN system, to be made simple in circuit configuration containing complex electrical signal transmission lines. With a presently available digital data switching technology, however, the internal switching units are very difficult or unable to meet such technical requirement. The reason for this is as follows: the data transmission line path, naturally, becomes more complex as the optical links associated therewith are increased in number each of which allows to deal with high-speed data signals at increased transmission rate.

SUMMARY OF THE INVENTION

It is therefore an object of the present invention to provide a new and improved optical data transmission architecture for extra large-capacity information communications network systems.

It is another object of the present invention to provide a new and improved optical data transmission system and its method which can minimize the internal data exchange function in every terminal station provided in an extra large capacity information communications network without degrading the performance of the network.

In accordance with the above objects, the present invention is addressed to a specific technique for processing information signals inside a terminal station associated with other stations in an extra large capacity information communications network system.

The terminal station includes therein a signal input section, an internal signal exchange section, and a signal output section. The terminal station is supplied with several kinds of optical information signals which are time-division multiplexed and optical frequency-division multiplexed when transmitted from certain ones of the terminal stations.

The input optical multiplexed signals of terminal station are "disassembled" or decoded by the signal input section into a number of electrical time-division multiplexed information signals. The signal exchange section partially exchanges the electrical information signals in such a manner that only specific electrical information signals which are selected from among the electrical signals are subjected to the line exchange in accordance with destinations of them. The output signals of the exchange section, e.g., exchanged time-division multiplexed information signals are then supplied to the signal output section. This section executes an optical frequency-division mutiplexing processing for the exchanged electrical time-division multiplexed information signals supplied thereto, thereby to send out optical frequency-division and time-division multiplexed information signals, which will then be transferred onto the corresponding ones of external signal transmission lines associated with the terminal station.

It is very important that the remaining ones of the input information signals other than the specific information signals are prevented from being transferred through the exchange section: these signals are directly transferred to the signal output section. This means that the signal exchange section is no longer required to automatically perform its exchanging operations with respect to all the information signals input to the terminal station. This fact may serve to lighten the heavy workload of the signal exchange section. As a result, the internal arrangement of every terminal station can be much simplified regardless of increase in the capacity of the information communications system, whereby the above objects of the invention can thus be attained.

Other and further objects of this invention will become obvious upon an understanding of the illustrative embodiment about to be described or will be indicated in the appended claims, and various advantages not referred to herein will occur to one skilled in the art upon employment of the invention in practice.

BRIEF DESCRIPTION OF THE DRAWINGS

In the detailed description of a preferred embodiment of this invention presented below, reference is made to the accompanying drawings in which:

FIG. 1 is a diagram showing schematically the overall arrangement of an optical data transmission/communications system containing terminal stations associated with one another via optical data transmission lines in accordance with one preferred embodiment of the present invention;

FIG. 3 is a block diagram showing the internal arrangement of the terminal station shown in FIG. 2 in more understandable manner;

FIG. 4 is a diagram showing the arrangement of a simplified model of the communications network system shown in FIG. 1;

FIG. 5 is a diagram showing schematically the internal configuration of one terminal station in the network system shown in FIG. 3;

FIG. 6 is a diagram showing the internal arrangement of a certain one of signal input sections provided in the terminal station shown in FIG. 5.

DETAILED DESCRIPTION OF THE PREFERRED EMBODIMENTS

Figure 2:
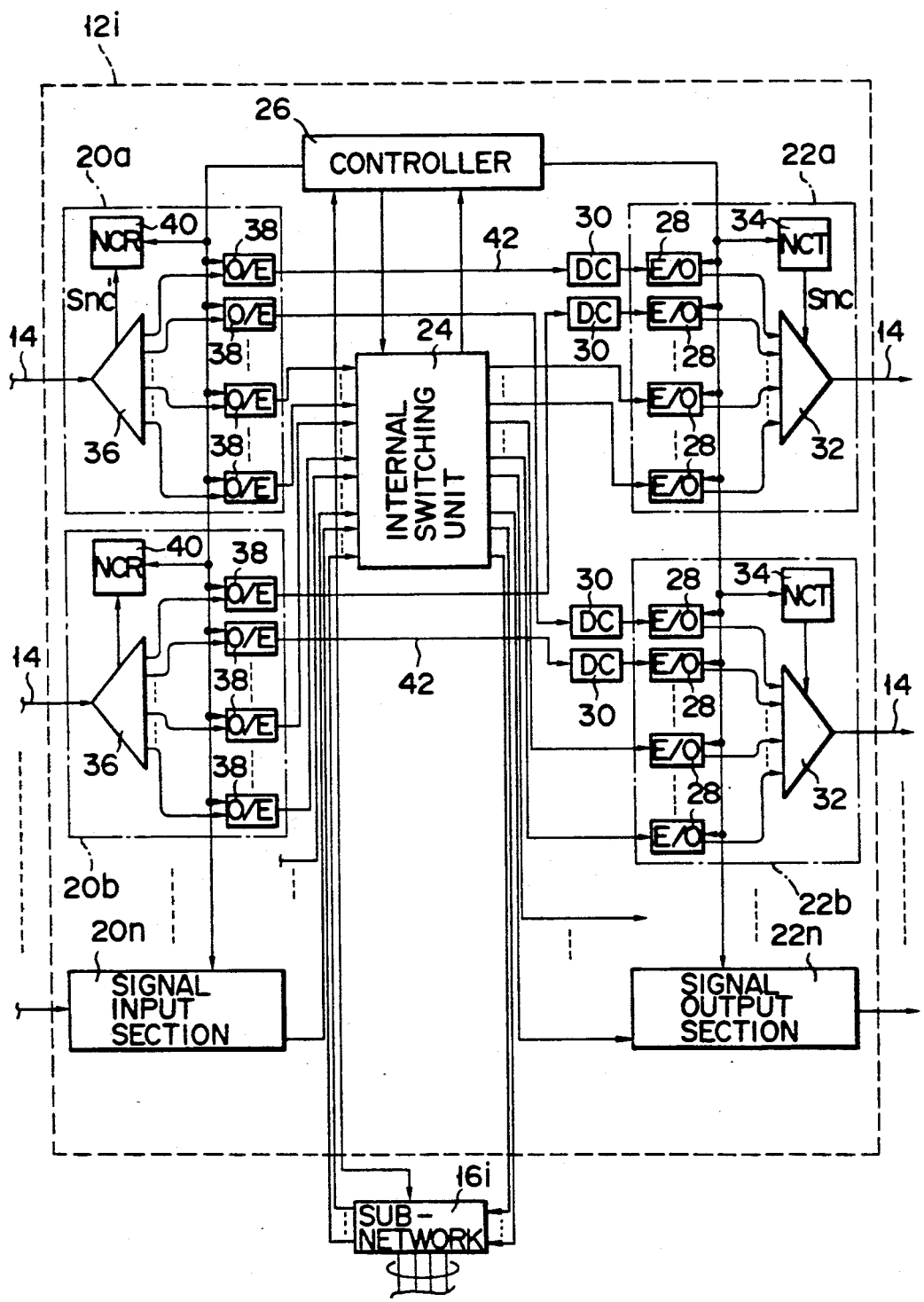
FIG. 2 is a block diagram showing in detail the internal configuration of a certain terminal station provided in the information communications system shown in FIG. 1.

Referring now to FIG. 1, an optical information communications network system in accordance with one preferred embodiment of the present invention is generally designated by reference numeral "10." This system is called the "broadband integrated digital network for optical data communications" or "B-ISDN system" in short.

Optical data transmission/communications system 10 works under the broadband integrated services digital network (B-ISDN) architecture, and includes a number of terminal stations or local stations 12 as shown in FIG. 1. These terminal stations 12 are interconnected directly or indirectly with one another via optical multiplexed signal transmission lines 14 made of optical fiber cables, generally known as the "optical fiber links." Terminal stations 12 are provided with sub-network systems for data transmission/communications that are associated therewith, respectively. Each of these sub-networks 16 may be any type of network system, such as a local area network, a CATV network, local area network with sub-loop, a simple star-type subscriber communications network, a satellite communications system, and so on. In the following description, sub-networks 16 also follow optical data transmission systems; electrical data transmission systems may be used instead to these networks 16.

Each of terminal stations 12 takes in and sends out several kinds of optical information signals so that communication can be made between itself and one or a plurality of terminal stations 12 associated in this B-ISDN system. The transmission of optical input signals and output signals of each terminal station 12*i* is transmitted via the corresponding ones of optical fiber link cables 14. Each terminal station 12 extracts, from the input information signals externally supplied thereto, some information signals which are to be transferred to sub-network 16*i* associated with the terminal station 12*i*; each station 12*i* handles and exchanges the remaining information signals, e.g., the signals to be distributed to other terminal station or stations via itself, in accordance with the destination data of the information signals. In such signal exchanging operations, each terminal station 12 is equipped with an internal digital data switching unit, which will be explained in detailed later in this specification.

Optical data transmission/communications system 10 deals with optical information signals which are multiplexed based on the B-ISDN architecture. These information signals are multiplexed in such a manner that the signals aiming at the same destination area (or terminal station) are time-division multiplexed together to produce time-division multiplexed information signal cells, and that specific signals of these signals to be transferred to the same direction (link) are "bundled together by " optical frequency-division multiplex processing. The resultant multiplexed signals may include several kinds of information or data signals such as high-definition TV image signals, computer data signals, audio signals, etc. In this embodiment, each information signal is digitized, time-division multiplexed, and then optical frequency-division multiplexed to thereby produce time-division/optical frequency-division information signals which are assigned with a preselected optical frequency, respectively. For instance, a group of information signals of 150 Mbps are 16-channel time-division multiplexed for the purpose of data transmission, and then converted into a digital multiplexed signal having a series of cells the data rate of which is 2.5 Gbps. Each cell is 125 microseconds in length. Each of the digital multiplexed signals are "superimposed" with a carrier light having a predetermined optical baseband frequency on the corresponding optical fiber link cable 14. Continuous phase frequency shift-keying (CPFSK) method using direct current modulation of semiconductor lasers may be used for the above superimposing processing between digital data signals and the carrier light. Optical fiber link cables 14 for transmission of the time-division/optical frequency-division multiplexed data signals may be lowloss single-mode optical fiber cables that have the zero-dispersion wavelength in the vicinity of 1.3 micrometers.

With such optical fiber cables 14, the multiplexed signal components of a data signal ride on a series of cells having the same optical frequency; therefore, even when a packet exchange system is used, continuous high-definition TV image signals can be transmission in the same manner as in the well known branch line exchange system. In this case, however, when a part of the data signals that are time-division multiplexed is terminated, it will happens that an empty channel remains in the cell. Such generation of the empty channel will reduce the cell usage efficiency. According to this embodiment, a specific scheme is utilized wherein, if the sum of empty channels remaining in two adjacent cells which deal with data signals to be directed to the same direction exceeds the total channel number (16, for example) of a cell, these two cells are combined together to define a new enlarged cell. With such an arrangement, the cell usage efficiency in the branchline exchange system can be improved to be as high as that in the packet exchange system.

As shown in FIG. 2, one terminal station 12*i* essentially consists of four parts: an array of signal receiver (input) sections 20*a*, 20*b*, . . . , 20*n*; an array of signal transmitter (output) sections 22*a*, 22*b*, . . . , 22*n*; digital data switching (data exchange) unit 24; and main controller 26.

Internal switching unit 24 is generally provided between signal input sections 20 and signal output sections 22, and co-operates not only signal input sections 20 and signal output sections 22, but also with sub-loop 16*i* which associates with terminal station 12*i*. Main controller 26 is provided so that it communicates directly with the internal components 20, 22, and 24. Main controller 26 may be a digital computer that controls individually or wholly these components. Signal input sections 20 are connected with the corresponding ones of optical fiber cables 12 respectively, and receives optical digital CPDSK-multiplexed data signals that are externally transmitted and supplied to this terminal station 12*i*. Internal switching unit 24 internally exchanges some of electrical data signals generated by signal input sections 20, or the all of the data signals, if desired, and distributes these signals among signal output sections 22 under the control of main controller 26. Signal output sections 22 are connected with the corresponding ones of optical fiber cables 12 respectively, and send out or transmit optical CPFSK-multiplexed data signals externally.

Each of signal output sections 22 includes a plurality of electrooptical converting devices 28, which may be called the "E/O converters." Some of these receivers 28 are associated with signal input sections 20*a*, 20*b*, . . . , 20*n* via internal switching unit 24; others of them are connected directly with the signal input sections by direct connection line units 30, i.e., they are connected with the signal input sections without passing through switching unit 24. E/O converters 28 may operate independently of one another. In each signal output section 22, all of devices 28 provided therein are connected at their output terminals to optical demultiplexer 32. Optical demultiplexer 32 is supplied with optical network control signals Snc that are supplied from main controller 26 via network control signal transmitting devices 34.

Every O/E conversion device 28 is constituted by using a laser drive circuit, a data buffer memory, a wavelength-tunable semiconductor laser module with optical isolators, a laser wavelength stabilizer circuit, a laser output intensity stabilizer circuit, and the like, which are not shown in the accompanying drawings, and superimpose digital data signals with carrier light to produce optical digital CPFSK data signals to be transmitted externally out of terminal station 12*i*. The range of laser oscillation wavelength may be about a 1.55 micrometers band. The width of laser oscillation spectrum may be 4 MHz; the wavelength tuning range may be 800 GHz (wavelength is about 6.4 nanometers) or more. In this case, the minimum shift keying (MSK) with depth of modulation of 0.5; the frequency deviation is 1.25 GHz, for example.

If the channel width is set to 12.5 GHz (wavelength is 0.1 nanometer), 65 channel-data transmission may be available in maximum by using 65 devices 28 in each signal output section 22 of terminal station 12*i*. In this embodiment, one channel is assigned to network control signal transmitter 34; therefore, 64 data signal transmission channels are provided in each signal output section 22. When a data signal is input to a certain device 28, main controller 26 searches for a "free" optical frequency channel that remains unoccupied, and sets the optical frequency of device 28 to that of the free optical frequency channel. The length of such frequency switching time will be determined depending upon the carrier life-time inside the semiconductor laser being used (not shown in FIG. 2) and/or thermal effect thereof: high-speed frequency switching of less than 10 nanometers may be available for device 28 if suitable circuit design is made. Generally speaking, in order to prevent a data signal from "busy" or interfering with the transmission of other data signals on a signal transmission line path, it is required that the maximum number of data signal reception devices 28 to be connected to an optical fiber link cable 14 is larger than the number of optical frequency channels.

Network control signal transmitter 34 "bundles" or assembles together rough destination data of the time-division multiplexed data signal cells using a specifically selected frequency that is out of the frequency band assigned to these data signal cells; a plural pieces of the destination data bundled are supplied to optical multiplexer 32 prior to the transfer of these data cells. The optical frequency of oscillation of network control signal transmitter 34 is fixed to a predetermined value. The other conditions may be same as those used in E/O converters 28 described above. Network control signal Snc may include in addition to the destination data a monitor signal which indicates degradation in data transmission, such as fault, malfunction, busy, etc. if any, a synchronization signal, or the like. The synchronization signal is used to synchronize the operations of overall components in each of signal output sections 22.

Optical multiplexer 32 execute an optical frequency-division multiplexing processing with respect to optical output signals of data signal reception devices 28 and those of network control signal transmitter 34, e.g., optical network control signal, thereby generating an optical data signal that is optical frequency-multiplexed. This optical signal is then supplied to the corresponding optical fiber link cable 14 out of terminal station 12i. To enable to do such task, optical multiplexer 32 has a plurality stages of optical fiber coupler units (now shown in FIG. 2), each of which is made of a matrix of single-mode optical fiber couplers of 2 rows and 2 columns. The number of the stages of optical fiber coupler units will increase as the optical signals to be subjected to the optical multiplexing process are increased in number. An optical amplifier may be added if such increase in the stage number of optical fiber coupler units causes the coupling loss to increase beyond an allowable upper limitation.

Let's explain about signal input section 20. The time-division/optical frequency-division multiplexed signals that are generated in the manner as described above will be then transferred by optical fiber link cables 14 to a target terminal station or stations 12. Terminal station 12i shown in FIG. 2 is also supplied with time-division/optical frequency-division multiplexed data signals from other associating terminal stations not shown in FIG. 2 in the same manner of data transmission. These optical input multiplexed data signals enter first to signal input sections 20a, 20b, . . . , 20n of terminal station 12i shown in FIG. 2.

As shown in the left side of FIG. 2, each of signal input sections 20 includes optical demultiplexer 36 which is connected to the corresponding one of optical fiber link cables 14. Optical demultiplexer 36 "disassembles" or demultiplexes optical multiplexed data signals into several number of individual time-division multiplexed data signals having different optical frequencies and a network control signal Snc containing rough destination data signals assigned thereto. The demultiplexed signals are still optical signals. The internal function of optical demultiplexer 36 is in principle reverse to that of the aforementioned optical multiplexer 32. The signal loss in optical demultiplexer 36 may be compensated for by an optical amplifier that will be additionally provided in the signal input sections 20, if required.

Demultiplexed output signals of optical demultiplexer 36 are supplied to an array of optoelectric (O/E) converting devices 38. Each of these O/E data converters 38 is a wavelength-selective data reception device, which can detect or sense only a specific optical signal component having a predetermined optical frequency. Data receiving devices may be polarization diversity reception type heterodyne delay detectors, which use as their local oscillation light source a wavelength-changeable semiconductor laser element. The width of local oscillation spectrum is 4 MHz; the wavelength tuning range is 800 GHz or more. The intermediate frequency band of it is about 5 GHz. Generally speaking, the number of O/E converters 38 to be provided in each signal input section is so set as to be larger than the optical frequency channel of optical fiber link 14. The tuning of optical frequency is performed with each data cell as a unit.

In each signal input section 20, optical demultiplexer 36 is also connected with network control signal reception device 40, which detects only an optical signal component of specifically selected optical frequency, including a network control signal. Reception device 40 is essentially same in its configuration as devices 38. Network control signal Snc' extracted from the input signals is supplied under the control of main controller 26 to network control signal reception device 40 before several kinds of time-division multiplexed data signals arrive at the corresponding data signal transmitters 38. Main controller 26 sets the detectable optical frequencies of O/E converters 38 to the corresponding ones of signal cell wavelengths respectively, that are different from one another, in accordance with the destination data (distribution information) represented by control signal Snc' so that in each signal input section 20 each of different data signals of mutually different optical frequencies will be transferred to the corresponding device 38.

In order for main controller 26 to complete the whole setting of optical frequency onto data converting devices 38 before data signals are actually arrive at devices 38, it should be required that the difference between the arrival times of the network control signal Snc' and the signal cells is larger than the total value of a delay time in network control signal receiver 40, an actual processing time of main controller 26, and an actual setting time of optical frequency in devices 38. If network control signal Snc' itself consists of the similar unit cells as in the input data signals, it becomes possible to arrange the signal Snc' so that it contains at its first half period the distribution information of a next set of data signal cells that will be supplied to the same input section 20 at the next timing which follows just after the instant time in progress, and contains in the second half period several types of control signals such as a signal transmission monitoring signal, a synchronous signal, and the like. With such an arrangement, some suitable degree of time margin can be fixed between the transmission of the data signal cells and the transmission of its distribution information. Such time margin will be an extra time that corresponds to a half the cycle of a unit cell time.

Internal data switching unit 24 disassembles some of time-division multiplexed data cells, which are output by signal input sections 20 and required to at least partially branched to a plurality of optical links o to be transferred or distributed to sub-network 16 associated with this terminal station 12, into a plurality of low-bit rate signals. These low-bit rate signals are then rearranged in such a manner that data signal components to be distributed to the same target terminal station and terminal stations near that station are grouped together, time-division multiplexed again, and optically multiplexed using the same optical frequency carrier. The internal data exchange processing of switching unit 24 is also applied to data signals transmitted from sub-network system 16 associated in direct with respective terminal station 12i.

Attention should be paid to the fact that switching unit 24 does not automatically execute the aforementioned "data signal exchanging rearrangement" operations with respect to all of the time-division multiplexed output data signals of signal input sections 20 in terminal station 12i. Data switching unit 24 is released from duty of handing certain data signals which are included in the time-division/optical frequency-division multiplexed input data signals and which simply pass through terminal station 12i in such a form as they are originally input thereto in order to arrive at their desired other target terminal stations; such certain signals are transferred to signal output sections 22 along a separate route via direct connection line path units 30, after leaving O/E data converters 38 of signal input sections 20. This route may be called the "direct-transfer line path." The above certain data signals simply passing through terminal station 12i are assigned with certain optical frequencies appointed by the network control signal; accordingly, they appear on specific internal data transmission lines 42 only. Data switching unit 24 carries out the demultiplexing and exchanging operations only for data signals to be distributed to sub-network system 16i, data signals containing data components to be branched to different optical output fiber cables 14 of terminal station 12i, and data signals supplied from sub-network system 16i; therefore, the processing workload of internal switching unit 24 can be much decreased to lighten its exchanging duty.

In this embodiment, internal switching unit 24 first disassembles data signals input thereto into signals of 155 Mbps. These signals are then subjected to the aforementioned data exchange-processing, whereby the sixteen channels in maximum of signals of same transfer direction are bundled together and time-division multiplexed into 2.5 Gbps data cells. A batcher network may be used to collect the data signals to be transferred in same transmission direction in the present "B-ISDN" communications system 10.

It is very important for the embodiment of this invention that certain optical frequency signal components of the time-division/optical frequency-division multiplexed input data signals, which components simply pass through terminal station 12i to finally arrive at their target stations, are internally transferred from signal input sections 20 to signal output sections 2 not via data switching unit 24 but via direct-transfer line paths 30 in terminal station 12i, and then transmitted externally out of terminal station 12i. Each of direct-transfer line paths 30 executes a serial-to-parallel conversion so that 2.5 Gbps signals are converted into 625 Mbps signals, for example. The resultant 625 Mbps signals thus converted are subjected to a timing adjustment and a waveform-shaping processing inside direct connection line units 30. After the completion of internal signal processings, direct connection line units 30 carries out an inverse serial-to-parallel conversion, e.g., parallel-to-serial conversion, so that 2.5 Gbps signals are obtained again. The signals are then supplied to the corresponding ones of signal output sections 22. It should be noted that the timing adjustment and the waveform-shaping processing can be performed successfully without degrading the data transmission rate if high-speed ICs are used. In this case, serial-to-parallel conversion for converting 2.5 Gbps signals to low-rate signals will no longer be required; the above-mentioned internal signal adjustment processings can be effectively performed by using only a buffer memory for storing data temporarily.

A model illustration shown in FIG. 3 is provided in order to make it easy to understand the essence of the complicate internal arrangement of terminal station 12i. A number of optical demultiplexers 36 of signal input sections 20 are respectively connected to data inputting optical fiber cables 14a; a number of optical multiplexers 32 of signal output sections 22 are respectively connected to data outputting optical fiber cables 14b. Optical output data signals of optical demultiplexers 36 are converted by the corresponding optoelectric converters 38 into electrical data signals. Some of these electrical data signals which are time-division multiplexed either with data to be transferred to sub-network system 16i associated with this terminal station 12i, or with data signals containing data components to be distributed among other data outputting optical fiber cables 14b, are normally transferred to internal switching unit 24, and then subjected to the "data exchange-rearranging" processings therein. On the other hand, the rest of electrical data signals, e.g., data signals which enter terminal station 12i to simply pass through it in order to finally arrive at their target terminal stations other than station 12i in a signal form as they are input to terminal station 12i, are specifically arranged: they are directly sent to multiplexers 32 of signal output sections 22 without via switching unit 24. Signal output sections 22 have E/O data converting devices 28 serving as electrooptical converters, by which the data signals are converted into the corresponding optical signals before they are supplied to optical multiplexers 32.

Internal switching unit 24 may be constituted by main switch section 4 that handles electrical data signals, demultiplexers 46 provided at the pre-stage of main section 44, and multiplexers 48 provided at the post-stage of the main section. Main section 44 is connected to subnetwork 16i such as a LAN system, which is associated with terminal station 12i. Electrical output signals of main section 44 are time-division multiplexed by multiplexers 48 for the purpose of the aforementioned data "rearrangement and exchange" processing, converted by electrooptical converters 28 into electrical data signals, and then sent out by optical multiplexers 32 onto either data outputting optical fiber cables 14b or subnetwork system 16i. Overall of the internal components of terminal station 12i 20, 22, 24, 28, 36, 38, 44, 46, 48 may operate under the control of main controller 26 (see FIG. 2) in a manner as described above; in FIG. 3, however, this main controller is omitted for the aim of simplification of illustration only.

With such an arrangement, switching unit 24 which is provided inside each of associating terminal stations 12 in B-ISDN type optical data communications network system 10 can be released from duty of handing the entire part of time-division multiplexed data signals that are supplied and input to terminals station 12i including the data switching unit in accordance with the optical frequency-multiplex scheme. Internal switching unit 24 may execute its data exchange with respect only to the minimum number (20 percent of the total input data signals) of input data signals selected to meet the above-mentioned conditions; the remaining ones of the input data signals are "processed" by direct connection line units 30 without via switching unit 24. This arrangement enables to decrease or lighten the workload of internal switching unit 24 in each terminal station 12i. This means in different point of view that a part of internal data exchange function expected to be executed inside each terminal station associated in broadband integrated data communications network system 10 is allocated also to the data transmission network itself. This results in the internal circuit configuration of each terminal station 12 being greatly simplified without degrading the basic data transmission performance, such as data transmission efficiency, high-speed data rate, power consumption, setting cost of terminal stations, etc. Such simplification in terminal configuration will be able to contribute to put forward the practical reduction of extra-large capacity optical data transmission/communications system of several tens or several hundreds of Gbps.

The data transmission scheme of B-ISDN type optical data communications network system 10 in accordance with one preferred embodiment of the present invention will be described in more detail with reference to a model of simplified network system presented in FIGS. 4 and 5. In this network model, four terminal stations 12a, 12b, 12c, and 12d exit and are associated with one another via data inputting optical fiber cables 14a-1, 14b-1, 14c-1 and data outputting optical fiber cables 14a-2, 14b-2, 14c-2. Terminal stations 12a, 12b, 12c, 12d are provided with subnetwork systems 16a, 16b, 16c, 16d, respectively. One of these terminal stations 12a, 12b, 12c, 12d, station 12d, for example, has its internal circuit configuration shown in FIG. 5. The internal arrangement of a certain input section 20a of terminal station 12d is shown in FIG. 6.

As shown in FIG. 6, input section 20a of terminal station 12d has an array of optoelectric converters which serve as network control signal receiver 40 and O/E data converters 38. These optoelectric converters are allocated with detectable optical frequencies λ under the control of main controller 26. For example, optical frequency λ0 is assigned to the optoelectric converter acting as network control signal receiver 40; the remaining optoelectric converters 38-1, 38-2, ..., 38-8 are assigned with optical frequencies λ1, λ2, ..., λ8, respectively. Network control signal receiver 40 extracts network control signal Snc' from the output signals of optical demultiplexer 36, and supplies it to main controller 26 (see FIG. 2). In this system, time-division multiplexed data signals output by data signals of devices 38-1 through 38-6 are transferred to output section 22a; only those of devices 38-7 and 38-8 are supplied to internal switching unit 24.

Figure 7:
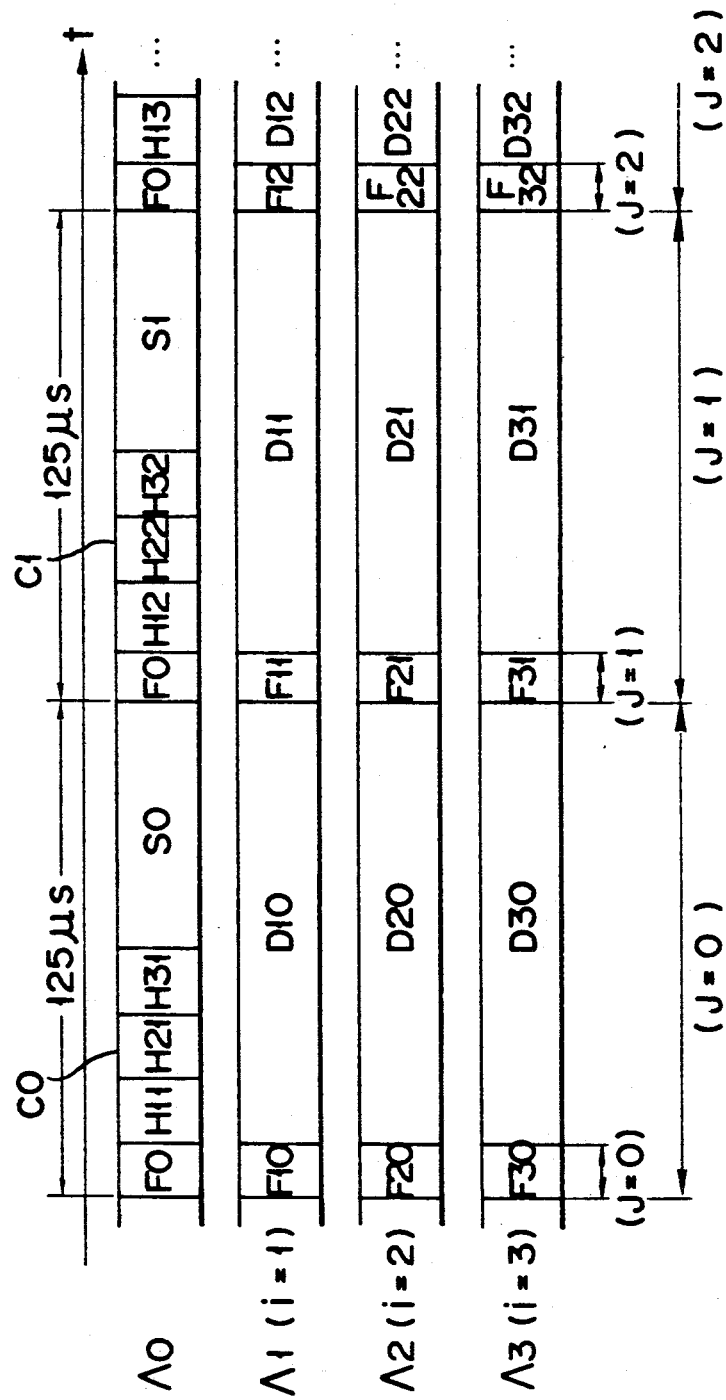
FIG. 7 is a diagram showing the arrangement of a plurality of data signal channels of the terminal station shown in FIG. 5.

Representing data transmission channels as "λi," the channel for transmitting the network control signal Snc is channel λ0, and channels λ1, λ2, and λ3 are used for transmission of data signals, as shown in FIG. 7. Data signal transmission channels λ1, λ2, and λ3 have data cells designated by "Dij," wherein suffix "i" designates the channel number, while suffix "j" denotes the order of appearance on the time axis. The data transmission rate is 2.5 Gbps. Each cell Dij is sixteen-channel time-division multiplexed at 150 Mbps. Each cell Dij has flag Fij at its front most position thereof. Each of cells of network control signal Snc in optical frequency λ0 has a synchronization flag Fij which is positioned at the front most position thereof, destination data signals Hi(j+1), (i=1, 2, 3), of data cells Di(j+1) that will come in the next timing, and several kinds of control signals Sj positioned at the rear most position of the data cell.

At a time point j=0, the destination of cell D10 is terminal station 12b, that of cell D20 is stations 12c: cell D30 is "empty." The detectable optical frequency λ3 of optoelectric converting device 38-3 is set to "λ1"; that λ5 of device 38-5 is set to "λ2." The remaining data receivers are kept insensitive. Now it is assumed that destination data component H11 contained in network control signal cell C0 specifies terminal station 12b, destination data component H21 also specifies station 12b, destination data component H31 specifies both the stations 12b and 12d. Main controller 26 makes O/E devices 38-4 and 38-7 be activated or in the ready-for-sense condition in response to the destination signal during the second half period of cell time of j=0. During the flag time period of j=1, main controller 26 causes device 38-5 to be kept inoperative, and at the same time, changes the sensible optical frequencies λ4 and λ7 of devices 38-4 and 38-7 to be equal to "λ2" and "λ3," respectively. The required time length for changing the optical frequencies is 10 nanoseconds at most; therefore, the length of 100 nanoseconds is sufficient for the total length of flag time. Under such condition, the setting of "λ3=λ1" relationship is kept unchanged. Destination data components H11 and H21 are transferred to network control signal transmitter 34 (see FIG. 2) in signal output section 22b during the second half period of the cell time, and will be sent out onto a corresponding optical fiber cable 14b-2 before data cells having the contents of data cells D11 and D21 are externally transmitted.

Subsequently, at the time point of j=1, the contents of data cell D31 is disassembled by switching unit 24 into sixteen channel data components. Some of these data components which will be distributed to sub-network 16d are bundled together and supplied to the sub-network. Data signals which aims at terminal station 12b are time-division multiplexed with other data signals, which are supplied from another optical fiber cable, such as cable 14c-1, and/or from sub-network system 16d and will be transferred also to terminal station 12b; so that new data cell is formed. The new data cell is then transferred to signal output section 22b. At this time, main controller 26 generates, for such new data cell, a new destination data signal, which is supplied to network control signal transmitter 34 (see FIG. 2) of output section 22b.

Data signal cells D11 and D21 that aim at terminal station 12b as their target are prevented from being transferred via switching unit 24: they are directly supplied by direct connection line units 30 to signal output section 22b.

Let's consider about the case wherein destination data component H12 of network control signal cell Cl represents that data signals are to be uniformly and simultaneously distributed toward all the terminal stations associated in this communications system in a manner generally known as the "broadcast type data distribution," and wherein destination data component H22 designates terminal station 12b, while destination data component H32 designates terminal stations 12c and 12d. In this case, $80\ 5 = \lambda 7 = \Lambda 1$ is set in the flag at the time point of j=2 in a similar manner as described above: the setting of $\lambda 3 = \Lambda 1$, $\lambda 4 = \Lambda 2$, and $\lambda 7 = \Lambda 3$ are kept unchanged. The contents of data cell D32 is divided by switching unit 24 into a group of data to be transferred to optical fiber cable 14c-2 and a group of data to be transferred to sub-network system 16d. Data cell D12 detected by optoelectric converter acting as data signal transmitter device 38-6 is identified by switching unit 24 from the others, and is then transferred sub-network system 16d. The contents of cell D12 is transferred also to terminal stations 12b and 12c via O/E converters 38-3 and 38-5 and direct connection line units 30.

According to this example, since the system scale is reduced only for the purpose of facilitate simplification of explanation, technical advantage over the prior art system may not so clear. However, the operation concept explained above will be also true for the embodiment network system 10 shown in FIG. 1. When the number of input/output optical fiber link 14 is set to ten, the channel number of direct connection line units 30 per a pair of input/output link cables is twelve, and the channel number to be connected between signal input sections 20 and switching unit 24 is also twelve, then one hundred and thirty six optoelectric data signal transmitters 38 should be required for each signal input section 20i. The same number of electrooptical data converting devices 28 will be required for each of the signal output sections 22. As a result, switching unit 24 is supplied with 1,920 branch-line input signals, that is 16 times 12 times 10 at 150 Mbps. In contrast with this fact, if the conventional system architecture is simply applied to the same scale of B-ISDN type optical data communications network system, switching unit 24 in each terminal station must execute its data exchange processing automatically with respect to the entire input data signals, the line number of which is increased as many as 10,240 (=16×64×10). Comparing this value with that of above-mentioned embodiment of this invention clearly may teach that the data exchanging workload of switching unit 24 of the present invention which operates in a manner as described above can be decreased and lightened to less than one fifth, e.g., 20 percent.

With such "20 percent lighted load" feature, the internal circuit arrangement of switching unit 24 can be simplified to less than one twenty-fifth that of the conventional one, since it is almost proportional to square value of the input channel number. Increasing of input-/output sections in its scale may be easily compensated for by utilizing solid-state electronic elements, such as semiconductor lasers, arrays of photodetective devices, ICs, LSIs, etc. Power consumption may be kept small since all of the components constituting the signal input-/output sections are not always activated at the same time. Technical advantages resulting from simplification of data exchange units will surpass disadvantages that comes after enlargement in the scale of signal input-/output sections.

It should be noted in such a large-scale data communications network system that simplifying the internal configuration of switching unit 24 in every terminal station serves as a direct parameter which serves to decrease the size, the power consumption, and the setting cost of the system and to increase the operating reliability thereof. Therefore, it is very important for each terminal station to improve the usage efficiency of direct connection line units 30. In accordance with such requirement, data exchange unit 24 performs its data exchanging processing so that data signals to be directed to the same or nearly located terminal stations are time-division multiplexed together in the same data cell. According to the embodiment of this invention presented above, it is possible to reduce the ratio of the amount of data signals to be transferred to and processed by data exchange unit 24 for the total amount of overall input data signals up to less than 5 percent if the data capacity of the system will be further expanded: in such a case, the size of data exchange unit 24 will be able to be less than 1/400 that of the presently available one.

In the aforementioned embodiment, the network control signal is arranged so that it is optical frequency-division multiplexed at the same rate and under the same conditions as in the data signals; however, the network control signal may be processed in a different modulation/demodulation method and at a different data transmission rate. The network control signal may be transmitted in a plurality of fixed optical wavelengths. It is also a possible modification that the network control signal be processed in accordance with a direct-intensity modulated/direct detection scheme at 50 Mbps in 1.3 micrometers bandwidth. The destination data signal of the network control signal should not be necessarily provided for all the data cells; in such a case, the network control signal will be supplied only when the connection among data transmission lines is at least partially changed. Several kinds of monitoring data signals indicating fault, malfunction, chattering, or the like, if any, can be included in the network control signal; accordingly, main controller 26 can change the state of some of the data outputting optical fiber link cables to be connected to the destination address represented by the network control signal. The network control functions should not be fixedly gathered in a single component such as the "main controller." This means that the control functions executed by main controller 26 may be scattered among signal input sections 20, signal output sections 22, data exchange unit 24, and the like. For example, the control signal for each optical fiber link cable may be processed by a control subsection that is additionally provided inside each of the signal input sections. Under such condition, main controller 26 instead performs the total control of control subsections scattered among internal components of the terminal station and/or the processing of the network control signal. It is naturally said that all the optical terminal stations 12 are equivalent in its net-work control architecture with one another: it may be possible for some of the terminal stations to have a predetermined hierarchical structure such as a network terminal that is to be controlled by a center station for serving as the central network manager.

In the above-mentioned embodiment, each optical fiber link cable is arranged so as to internally operate in synchronism with data cells; however, the system of this invention may also to applied to a non-synchronous data transmission systems. When this invention is used in such system, data signals having different optical frequencies are made of length-changeable packet signal components each of which is associated with a corresponding control signal that is to be transmitted in a specific optical frequency prior to the transmission of the packet signals. In response to the reception of such control signal, main controller 26 selects an "empty" one from among those of optoelectric data converting devices 38 which are connected with the destination designated by the input control signal, and tuning its detectable optical frequency to a suitable optical frequency. With such an arrangement, the system configuration which is essentially same as in the previously described may be utilized, although it will be slightly complicated due to the necessity of providing in the internal data exchange section of every terminal station an additional unit for searching for empty data communication paths.

The embodiment described above may also be modified so that a header data is added independently of the network control signal to either each data signal cell or each packet. With the additional header data, the internal data exchange of data switching unit 24 may be performed in accordance with a self-routing exchange scheme. New destination data for rearranged multiplexed signals may be produced based on the header data. Alternatively, the internal data exchange in each terminal station may also be carried out by using the network control signal. In such a case, the header data will be able to be used as a part of the corresponding data signal: the header will be handled by a sub-network system 16 associated with the terminal station without an modification.

As has been described previously with reference to FIG. 4, the present optical fiber data transmission protocol can also deal with 1:N-broadcast type data communication systems wherein a plurality of pieces of destination data are assigned to a certain data signal, since main controller 26 can control optoelectric converters 38 which are respectively coupled with the corresponding one of the plural pieces of destination data to be set to the respective optical frequency of the data signal. This will become very advantageous when it is applied to various types of B-ISDN type data integration/communication systems.

In the above embodiment, each of the optoelectric converters 38 is connected either one of direct connection line path 30 connected to a pre-selected, specific data output section 22 and data exchange unit 24; however, it may be modified so that it is selectively connected to one of them under main controller 26, using a software program or a hardware switching means. Similarly, each of electrooptical converters 28 may be modified so as to be selectively connected either data output section 22 or data exchange unit 24 as required statistically. With such a changeable data transfer line arrangement, it is possible to improve the functional efficiency of data converters 28 and 38, which may lead to not only reduction in the absolute number of these components 28 and 38, but also to flexibility of the communication system by in regard to change in the conditional requirement, expansion of system size, or the like.

The system expansion can be made by simply adding a new branch to those of optical demultiplexers 36 and optical multiplexers 32 which remain unused, without any confliction with the presently executing data processing/communication operations. The expansion of system electricity may be accomplished by adding a physical electric circuit board. Main controller 26 is itself an independent computer system, so that it may be freely modified by simple extra programming so a to be adapted to system expansion. If the system expansion comes to the limitation with respect to a certain optical frequency band, optical frequency-division multiplexed data signals may be subjected to wavelength-division multiplex processing using a different optical frequency band. For example, 256 channels of data signals can be transmitted together on a single line of optical fiber cable, by performing 64-channel optical frequency-division multiplex with respect to 1.54-micrometer band, and 1.56-micrometer band, respectively. In that case, if 1 channel is set to 2.5 Gbps, 640-Gbps optical data transmission will be available.

As a special case, the data transmission system of the above embodiment of this invention may be used as an optical data exchange apparatus if data output sections 22 for receiving input data signal supplied from subnetwork system 16 are combined with data input sections 20 the output signals of which are transferred to the sub-network system using short-length optical fiber link cables.

What is claimed is:

1. An apparatus for serving as a terminal station coupled with other terminal stations in an optical information communications system, said apparatus comprising:

signal input means for receiving several kinds of optical information signals which are time-division multiplexed and optical frequency-division multiplexed when transmitted from certain ones of the terminal stations, and for disassembling the input signals into a number of electrical time-division multiplexed information signals;

signal exchange means connected to said signal input means, for exchanging selected signals which are selected from among the electrical signals in accordance with destinations of them, and for generating exchanged electrical time-division multiplexed information signals;

signal output means connected to said signal exchange means and external signal transmission lines, for optical frequency-division multiplexing the exchanged electrical time-division multiplexed information signals, and for sending out optical frequency-division and time-division multiplexed information signals onto corresponding ones of said external signal transmission lines; and bypass means provided between said signal input means and said signal output means, for directly transferring the remaining ones of said electrical signals from said signal input means to said signal output means without passing through said signal exchange means.

2. The apparatus according to claim 1, wherein said signal exchange means comprises:

demultiplexer means for decoding using a demultiplexing scheme said electrical signals supplied from said signal input means;

switching means connected to said demultiplexer means, for executing a data exchanging operation; and multiplexer means connected to said digital switching means, for multiplexing output signals of said switching means.

3. The apparatus according to claim 2, wherein said bypass means includes direct connection lines which are larger in data transmission rate than said switching means.

4. The apparatus according to claim 3, further comprising:

controller means, connected to said signal input means, said digital switching means, and said signal output means, for extracting said selected signals from all the input signals being externally supplied to said apparatus, for supplying said switching means with said selected signals, and for supplying simultaneously said bypass means with the remaining signals of said input signal.

5. The apparatus according to claim 4, wherein said signal input means comprises:

signal extract means for extracting a network control signal containing a destination data from said input information signals, and for sending said network control signal to said controller means.

6. The apparatus according to claim 5, wherein said controller means controls the signal exchanging operation of said switching means in response to said network control signal.

7. A signal processing method applied to an optical information communications system including a selected number of terminal stations which bidirectionally communicate with one another by optical data transmission lines, said method comprising the steps of:

disassembling optical information signals, which are time-division multiplexed and optical frequency-division multiplexed when transmitted to a certain terminal station from certain ones of the other associating terminal stations, into a number of electrical time-division multiplexed information signals;

selecting specific signals from among said electrical time-division multiplexed information signals in accordance with a predetermined algorithm;

supplying said specific signals to a signal exchange section provided inside said certain terminal station, which executes a line exchanging operation for said specific signals thereby to generate exchanged electrical time-division multiplexed information signals;

optical frequency-division mutiplexing the exchanged electrical time-division multiplexed information signals to produce optical frequency-division and time-division multiplexed information signals, which are then supplied to corresponding ones of external signal transmission lines provided for said certain terminal station; and directly sending outward from said certain terminal station the remaining ones of said electrical time-division multiplexed information signals to said signal output means without passing through said signal exchange section in said certain terminal station.

8. The method according to claim 7, wherein a predetermined kind of information signals of said electrical time-division multiplexed information signals are prevented from being transferred to said signal exchange section, said certain signals being externally transmitted in such a form as they are disassembled.

9. The method according to claim 8, wherein said predetermined kind of information signals are larger in their transmission rate than said specific information signals being moved through said line exchange section inside said certain terminal station.

10. The method according to claim 9, wherein an amount of said predetermined kind of information signals is more than half the total amount of input information signals of said certain terminal station.

11. A method according to claim 10, wherein a control signal is generated to represent the destination data of each of said information signals, said control signal being externally transmitted in a predetermined optical frequency to a target terminal station prior to the transmission of said information signals.

12. An optical information communication system including a plurality of terminal stations which bidirectionally communicate with one another by optical data transmission lines coupling said terminal stations, and which process several kinds of optical information signals that are time-division multiplexed and optical frequency-division multiplexed, each of said terminal stations comprising:

signal input means for, when the information signals are supplied thereto from certain ones of said terminal stations, disassembling the input signal into a number of electrical time-division multiplexed information signals;

signal exchange means connected to said signal input means, for exchanging selected signals which are selected from among the electrical signals in accordance with destinations of them, and for generating exchanged electrical time-division multiplexed information signals;

signal output means connected to said signal exchange means and external signal transmission lines, for optical frequency-division multiplexing the exchanged electrical time-division multiplexed information signals, and for sending out optical frequency-division and time-division multiplexed information signals onto corresponding ones of said external signal transmission lines;

bypass means provided between said signal input means and said signal output means, for directly transferring the remaining ones of said electrical signals from said signal input means to said signal output means without passing through said signal exchange means; and said signal exchange means including demultiplexer means for demultiplexing said electrical signals, digital switch means connected to said demultiplexer means, for executing a data exchange function, and multiplexer means connected to said digital switch means, for multiplexing output signals of said digital switch means.

* * * * *